(12) United States Patent
Kim et al.

(10) Patent No.: US 12,524,987 B2
(45) Date of Patent: Jan. 13, 2026

(54) MULTISCALE OBJECT DETECTION DEVICE AND METHOD

(71) Applicant: University Industry Foundation, Yonsei University, Seoul (KR)

(72) Inventors: Han Jun Kim, Seoul (KR); Seon Yeong Heo, Seoul (KR); Dong Kwan Kim, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 463 days.

(21) Appl. No.: 18/090,869

(22) Filed: Dec. 29, 2022

(65) Prior Publication Data

US 2023/0298309 A1 Sep. 21, 2023

(30) Foreign Application Priority Data

Mar. 15, 2022 (KR) .................. 10-2022-0032150

(51) Int. Cl.
*G06V 10/75* (2022.01)
*G06V 10/22* (2022.01)
(Continued)

(52) U.S. Cl.
CPC .......... *G06V 10/751* (2022.01); *G06V 10/22* (2022.01); *G06V 10/759* (2022.01); *G06V 20/17* (2022.01); *G06V 20/41* (2022.01)

(58) Field of Classification Search
CPC ...... G06V 10/75; G06V 10/751; G06V 10/22; G06V 10/759; G06V 20/17; G06V 20/40;
(Continued)

(56) References Cited

U.S. PATENT DOCUMENTS 8,824,733 B2 * 9/2014 Schamp .................. G06T 7/11
382/104
9,288,451 B2 * 3/2016 Oya ....................... H04N 7/183
(Continued)

FOREIGN PATENT DOCUMENTS

CA        3138839 A1 * 11/2020 ............. G06V 10/25
CN     112381071 A  *  2/2021 ............. G06F 18/25
(Continued)

OTHER PUBLICATIONS

Cheng, Ming-Ming, et al. "Global contrast based salient region detection." IEEE transactions on pattern analysis and machine intelligence 37.3 (2014): 569-582. (Year: 2014).*

*Primary Examiner* — Stephen R Koziol
*Assistant Examiner* — Benedict E Lee
(74) *Attorney, Agent, or Firm* — Paratus Law Group, PLLC

(57) ABSTRACT

There is provided a multi-scale object detection device. The device includes an image frame acquisition unit for acquiring a plurality of consecutive image frames, a critical region extractor for extracting at least one second critical region from a current image frame based on at least one first critical region extracted from a previous image frame among the consecutive image frames, a multi-scale object detector whose operation involves a first object detection process for the current image frame and a second object detection process for the at least one second critical region, and an object detection integration unit for integrating the results of the first and second object detection processes.

13 Claims, 6 Drawing Sheets

(51) Int. Cl.
*G06V 20/17* (2022.01)
*G06V 20/40* (2022.01)

(58) Field of Classification Search
CPC ........ G06V 20/41; G06V 20/49; G06V 10/25; G06V 10/80; G06V 10/811; G06V 10/62; G06V 10/771; G06T 3/40; G06T 5/50; G06T 7/11; G06T 7/30; G06T 7/70

See application file for complete search history.

(56) References Cited

U.S. PATENT DOCUMENTS

| | | | |
|---|---|---|---|
| 9,576,367 B2 * | 2/2017 | You | G06T 7/74 |
| 9,709,874 B2 * | 7/2017 | Ushijima | G06T 7/11 |
| 9,881,234 B2 * | 1/2018 | Huang | G06F 18/2163 |
| 10,056,001 B1 * | 8/2018 | Harris | G06V 20/176 |
| 10,062,155 B2 * | 8/2018 | Lavole | G06T 7/70 |
| 10,410,044 B2 * | 9/2019 | Nakashima | G06T 7/00 |
| 10,825,188 B1 * | 11/2020 | Tan | G06T 7/73 |
| 10,922,791 B2 * | 2/2021 | Lin | G06T 5/70 |
| 10,943,141 B2 * | 3/2021 | Sawada | G06V 20/58 |
| 10,977,421 B2 * | 4/2021 | Lin | G06F 30/398 |
| 10,977,768 B2 * | 4/2021 | Han | G06V 40/165 |
| 11,074,716 B2 * | 7/2021 | Lopich | G06V 10/50 |
| 11,093,762 B2 * | 8/2021 | Siegemund | G06V 10/757 |
| 11,095,899 B2 * | 8/2021 | Yonezawa | H04N 19/124 |
| 11,494,906 B2 * | 11/2022 | Sakai | G06V 40/167 |
| 11,518,390 B2 * | 12/2022 | Fujiyoshi | G06T 7/136 |
| 11,954,894 B2 * | 4/2024 | Deshmukh | H04N 17/002 |
| 12,100,140 B2 * | 9/2024 | Tsubota | G06V 10/82 |
| 2006/0215759 A1 * | 9/2006 | Mori | H04N 5/147 348/700 |
| 2020/0349382 A1 * | 11/2020 | Chen | G06T 7/246 |
| 2022/0383454 A1 * | 12/2022 | Holmes | G09G 5/377 |
| 2023/0169759 A1 * | 6/2023 | Kandpal | G06V 10/774 382/159 |
| 2023/0169771 A1 * | 6/2023 | Bigioi | G06V 10/764 382/103 |
| 2023/0196773 A1 * | 6/2023 | Iio | G06T 7/248 382/100 |
| 2023/0206485 A1 * | 6/2023 | Rao | G06T 7/73 382/103 |
| 2023/0230264 A1 * | 7/2023 | Guizilini | G01S 17/86 382/106 |
| 2023/0352052 A1 * | 11/2023 | Nabeto | G06V 10/70 |

FOREIGN PATENT DOCUMENTS

| | | | | |
|---|---|---|---|---|
| EP | 2662827 A1 * | 11/2013 | | G06T 7/174 |
| EP | 2833325 A1 * | 2/2015 | | G06T 7/20 |
| EP | 2995893 A2 * | 3/2016 | | F25D 29/00 |
| JP | 2018092547 A * | 6/2018 | | |
| KR | 20110023468 A * | 3/2011 | | G06T 7/20 |
| KR | 101048045 B1 * | 7/2011 | | G06T 7/97 |
| KR | 101130963 B1 * | 4/2012 | | G06V 10/469 |
| KR | 20160037643 A * | 4/2016 | | G06T 5/50 |
| KR | 10-2017-0021638 A | 2/2017 | | |
| KR | 101758684 B1 * | 7/2017 | | G06T 7/248 |
| KR | 2085035 B1 * | 3/2020 | | G06F 18/25 |
| KR | 102204041 B1 * | 1/2021 | | G09B 29/004 |
| KR | 2564477 B1 * | 8/2023 | | G06K 9/2054 |
| KR | 102564477 B1 * | 8/2023 | | G06V 20/52 |
| TW | 201727391 A * | 8/2017 | | G03F 7/706837 |
| WO | WO-2015014822 A1 * | 2/2015 | | G06T 7/20 |
| WO | WO-2020013395 A1 * | 1/2020 | | G06N 3/08 |

* cited by examiner

MULTISCALE OBJECT DETECTION DEVICE AND METHOD

CROSS REFERENCE TO PRIOR APPLICATION

This application claims priority to Korean Patent Application No. 10-2022-0032150 (filed on Mar. 15, 2022), which is hereby incorporated by reference in its entirety.

ACKNOWLEDGEMENT

The present patent application has been filed as a research project as described below.
 [National Research Development Project supporting the Present Invention]
 [Project Serial No.] 1711152718
 [Project No.] 2020-0-01361-003
 [Department] Ministry of Science and ICT
 [Project management (Professional) Institute] Institute of Information & Communications Technology Planning & Evaluation
 [Research Project Name] Information & Communication Broadcasting Research Development Project (R&D)
 [Research Task Name] Artificial Intelligence Graduate School Support Project (Yonsei University)
 [Contribution Ratio] 1/1
 [Project Performing Institute] University Industry Foundation, Yonsei University
 [Research Period] 2022 Jan. 1~2022 Dec. 31

BACKGROUND

The present disclosure relates to technology for detecting objects by using an unmanned aerial vehicle and, more particularly, to multi-scale object detection device and method by which it is possible to efficiently detect objects for a current frame based on information obtained from a previous frame.

As deep learning technology has been recently developed, there has been a growing demand for technology for detecting objects in videos, and research on the technology is being more actively conducted. Conventionally, technology for object detection by detecting objects on a single image has been mainly adopted, but, in recent years, there has been an increasing demand for the technology for detecting objects in videos.

Particularly, in the case of an object detection system applied to an unmanned aerial vehicle such as a drone, consecutive video frames may be used as an input value. When detecting objects, the size of an input image can greatly affect the time it takes and the accuracy of detection. In general, the size of an image may be reduced to complete detection by the target time required when using a drone.

However, when the size of an image is reduced in order to secure sufficient time, there may be a problem in that the accuracy in detecting objects is lowered.

RELATED ART DOCUMENT

Patent Document

Korean Patent Application Publication No. 10-2017-0021638 published on Feb. 28, 2017

SUMMARY

According to an embodiment of the present disclosure, there is provided multi-scale object detection device and method by which it is possible to efficiently detect objects for a current frame based on information obtained from a previous frame.

According to an embodiment of the present disclosure, there is provided the multi-scale object detection device and method by which it is possible to obtain a detection result with high accuracy at low cost because object detection on a single image frame is performed in parallel.

According to an embodiment of the present disclosure, the multi-scale object detection device includes an image frame acquisition unit for acquiring a plurality of consecutive image frames, a critical region extractor for extracting at least one second critical region from a current image frame based on at least one first critical region extracted from a previous image frame among the consecutive image frames, a multi-scale object detector whose operation involves a first object detection process for the current image frame and a second object detection process for the at least one second critical region, and an object detection integration unit for integrating the results of the first and second object detection processes.

The image frame acquisition unit analyzes sequential video frames and extracts image frames that are successive in time series and have a similar background to determine the plurality of consecutive image frames.

The critical region extractor determines the position of the at least one first critical region on the current image frame to determine the at least one second critical region.

The critical region extractor determines a reference object of each of the at least one first critical region and matches the reference object to the current image frame to sort out the at least one second critical region.

The at least one first critical region is fed back to the critical region extractor by the multi-scale object detector.

The multi-scale object detector detects a first object after down-sampling the current image frame in the first object detection process.

The multi-scale object detector determines the position and the class of the first object by detecting the first object.

The multi-scale object detector extracts the position and the class of a second object with a relatively high accuracy from the at least one second critical region in the second object detection process.

The multi-scale object detector assigns the first object detection process to a first processor and assigns the second object detection process to a second processor to process the first and second object detection processes in parallel.

The object detection integration unit detects objects on the entire current image frame by integrating the second object extracted in the second object detection process with the first object extracted in the first object detection process.

According to an embodiment of the present disclosure, a multi-scale object detection method includes an image frame acquisition step of acquiring a plurality of successive image frames, a critical region extraction step of extracting at least one second critical region from a current image frame based on at least one first critical region extracted from a previous image frame among the successive image frames, a multi-scale object detection step involving a first object detection process for the current image frame and a second object detection process for the at least one second critical region, and an object detection integration step of integrating the results of the first and second object detection processes.

The critical region extraction step involves the step in which the at least one first critical region determined in the multi-scale object detection step is fed back.

The multi-scale object detection step involves the step in which a first object is detected after down-sampling the current image frame in the first object detection process.

The multi-scale object detection step involves the step in which the position and the class of a second object are extracted with a relatively high accuracy from the at least one second critical region in the second object detection process.

The multi-scale object detection step involves the step in which the first object detection process is assigned to a first processor and the second object detection process is assigned to a second processor so that the first and second object detection processes are processed in parallel.

The present disclosure may have the following effects. However, it is not meant that a specific embodiment should include all of the following effects or only the following effects, so the scope of the present disclosure should not be understood to be limited thereto.

By the multi-scale object detection device and method according to the present disclosure, it is possible to efficiently detect objects on a current frame based on information obtained from a previous frame and obtain a detection result with high accuracy at low cost because object detection on a single image frame is performed in parallel.

By the multi-scale object detection device and method according to the present disclosure, it is possible to detect objects with high accuracy at low cost using limited power and computing power in an embedded system environment of unmanned aerial vehicles such as drones, and, in particular, by virtue of reduced power consumption, it is possible for an unmanned aerial vehicle to detect objects in real time while flying for a longer time.

DETAILED DESCRIPTION

Figure 1:
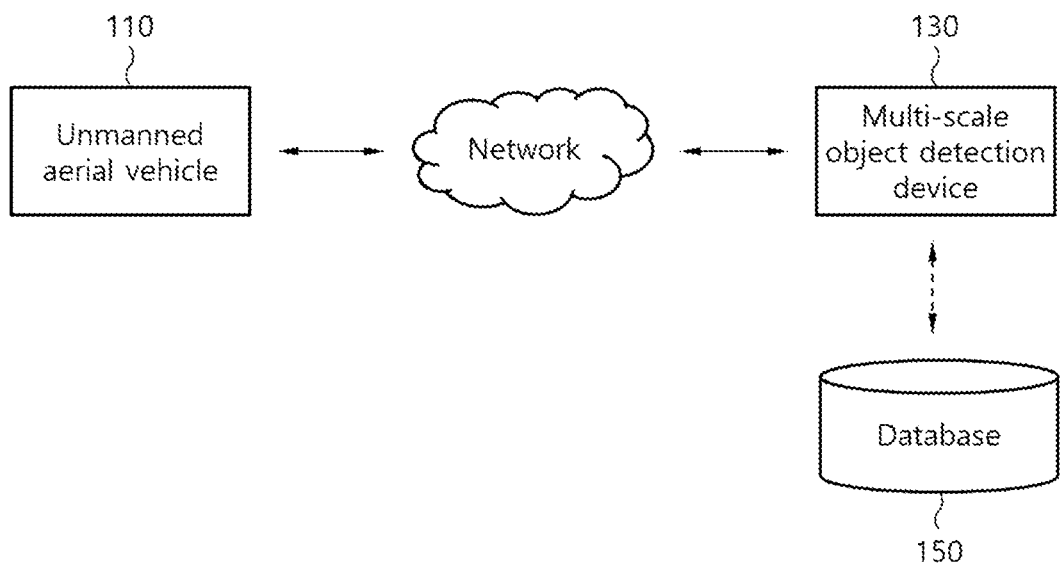
FIG. 1 is a view illustrating a multi-scale object detection system according to the present disclosure.

Since only embodiments for descriptions in terms of structure and function are described in the detailed description of the present disclosure, the scope of the present disclosure should not be construed as being limited to the embodiments described below. That is, since various modifications of the embodiments are possible and the embodiments may be embodied in various forms, it should be understood that equivalents in which the technology of the present disclosure may be realized are included in the scope of the present disclosure includes. In addition, with respect to the purposes or effects of the present disclosure, a particular embodiment is not supposed to include all such purposes or effects or only them, so the scope of the present disclosure should not be construed as being limited to such purposes or effects.

On the other hand, the meaning of the terms or expressions described in this specification should be understood as follows.

Expressions such as "first" and "second" are for distinguishing one component from another, and the scope of the present disclosure should not be limited by these expressions. For example, a first component can be referred to as a second component, and conversely, the second component can be referred to as the first component.

When a component is described as being "connected" to another component, it should be understood that the component may be directly connected to the other component or other components may exist therebetween. In contrast, a component is described as being "directly connected" to another, it should be understood that no other components exist therebetween. Meanwhile, other expressions for describing relationships between components such as "between/directly between" or "contiguous to/directly contiguous to" should be interpreted in the same way.

Expressions in the singular form include the meaning of the plural form unless they clearly mean otherwise in the context. Furthermore, expressions such as "comprise" or "have" are used to indicate that an embodied feature, a number, a step, an operation, a component, a part, or a combination thereof exists, and the possibility that one or more other features, numbers, steps, operations, components, parts, or combinations thereof may exist or be added should not be excluded by such expressions.

In each step, an identification code such as "a," "b," or "c" is used for convenience of description and is not intended to indicate the order of the step. Each step may be taken in a different order from its stated order unless its order is explicitly specified in the context. That is, each step may be taken in its specified order, or all steps may be taken simultaneously or may be taken in a reverse order.

The present disclosure may be implemented as a computer-readable code on a computer-readable recording medium, and the computer-readable recording medium includes all types of recording devices in which data readable by a computer system is stored, such as ROM, RAM, CD-ROM, a magnetic tape, a floppy disk, and an optical data storage device. In addition, the computer-readable recording medium may be distributed in network-connected computer systems to store and execute computer-readable codes in a distributing manner.

All terms used herein have the meanings commonly understood by a person having ordinary skill in the art to which the present disclosure belongs, unless they are otherwise defined. Terms defined in a general dictionary should be deemed to have the meanings that they would have in view of the related art, and cannot be deemed to have ideal or excessively formal meanings unless explicitly defined in such a way in this specification.

FIG. 1 is a view illustrating a multi-scale object detection system according to the present disclosure.

Referring to FIG. 1, the multi-scale object detection system 100 may include an unmanned aerial vehicle 110, a multi-scale object detection device 130, and a database 150.

The unmanned aerial vehicle 110 may correspond to a flying device capable of driving autonomously without a user's control. For example, the unmanned aerial vehicle 110 may be a drone. The unmanned aerial vehicle 110 may include a camera module for filming a surrounding area during its autonomous flight, a storage means for storing the filmed video, and a communication means for transmitting the filmed video to the outside.

In addition, the unmanned aerial vehicle 110 may interwork with the multi-scale object detection device 130 as a device included in the multi-scale object detection system 100. The unmanned aerial vehicle 110 may be operated by installing a dedicated program or application for interworking with the multi-scale object detection device 130, and may be connected to the multi-scale object detection device 130 through a network.

The multi-scale object detection device 130 may be implemented as a server corresponding to a computer or program by which a multi-scale object detection method according to the present disclosure is implemented. In addition, the multi-scale object detection device 130 may be connected to a user's terminal or the unmanned aerial vehicle 110 through a wired network or a wireless network such as Bluetooth, WiFi, and LTE, and may exchange data with the user's terminal or the unmanned aerial vehicle 110 through the network. Furthermore, the multi-scale object detection device 130 may operate in connection with an independent external system (not shown in FIG. 1) to perform related operations.

Meanwhile, in FIG. 1, the multi-scale object detection device 130 is illustrated as a device separate from the unmanned aerial vehicle 110, but is not necessarily limited thereto. It is needless to say that the multi-scale object detection device 130 may also be included in the unmanned aerial vehicle 110 as a logical operation device. For example, the multi-scale object detection device 130 may be included in an embedded system in the unmanned aerial vehicle 110, so the unmanned aerial vehicle 110 may also directly implement the multi-scale object detection method according to the present disclosure to independently detect objects.

The database 150 may correspond to a storage device for storing various types of information required in the process of the operation of the multi-scale object detection device 130. For example, the database 150 may store information about image frames of a video for detecting objects and information about an object detection model or training data, but is not necessarily limited thereto. For example, the database 150 may also store various types of information collected or processed while the multi-scale object detection device 130 implements the multi-scale object detection method according to the present disclosure.

Meanwhile, in FIG. 1, the database 150 is illustrated as a device separate from the multi-scale object detection device 130, but is not necessarily limited thereto. It is a matter of course that the database 150 may also be included in the multi-scale object detection device 130 as a logical storage device.

Figure 2:
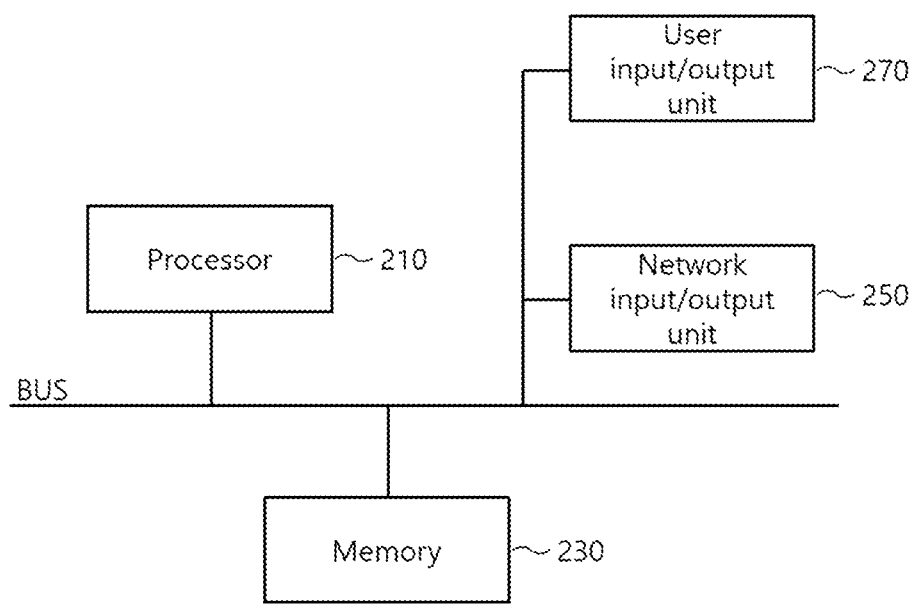
FIG. 2 is a view illustrating a system of a multi-scale object detection device according to the present disclosure.

FIG. 2 is a view illustrating a system of the multi-scale object detection device according to the present disclosure.

Referring to FIG. 2, the multi-scale object detection device 130 may include a processor 210, a memory 230, a user input/output unit 250, and a network input/output unit 270.

The processor 210 may carry out the procedures for the multi-scale object detection according to the present disclosure, may manage the memory 230 that is read or written in this process, and may schedule a synchronization time between a volatile memory and a non-volatile memory in the memory 230. The processor 210 may control the overall operation of the multi-scale object detection device 130, and may be electrically connected to the memory 230, the user input/output unit 250, and the network input/output unit 270 to control a data flow therebetween. The processor 210 may be a central processing unit (CPU) or a graphics processing unit (GPU) of the multi-scale object detection device 130.

The memory 230 may include an auxiliary memory device that is embodied as the non-volatile memory such as a solid-state disk (SSD) or a hard disk drive (HDD) and is used to store overall data required for the multi-scale object detection device 130 and a main memory device that is embodied as the volatile memory such as a random access memory (RAM). In addition, the memory 230 may be operated by the processor 210 electrically connected thereto, and thus may store a set of commands for the multi-scale object detection method according to the present disclosure.

The user input/output unit 250 may include an environment for receiving data input by a user and an environment for outputting specific information to the user, and may include, for example, an input device including an adapter such as a touch pad, a touch screen, an on-screen keyboard, or a pointing device and an output device including an adapter such as a monitor or a touch screen. In an embodiment, the user input/output unit 250 may correspond to a computing device accessed through a remote connection, and, in such a case, the multi-scale object detection device 130 may be operated as an independent server.

The network input/output unit 270 may provide a communication environment for connection with the unmanned aerial vehicle 110 through a network, and may include an adapter for communication such as a local area network (LAN), a metropolitan area network (MAN), a wide area network (WAN), and a value-added network (VAN). In addition, the network input/output unit 270 may provide a short-distance communication function such as WiFi or Bluetooth or a wireless communication function of 4G or higher in order to transmit data wirelessly.

Figure 3:
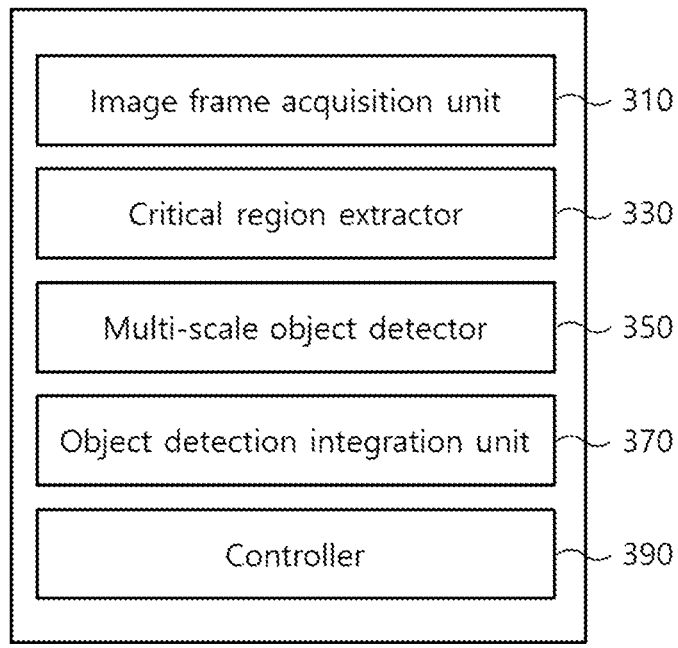
FIG. 3 is a view illustrating the functional components of the multi-scale object detection device according to the present disclosure.

FIG. 3 is a view illustrating the functional components of the multi-scale object detection device according to the present disclosure.

Referring to FIG. 3, the multi-scale object detection device 130 may include an image frame acquisition unit 310, a critical region extractor 330, a multi-scale object detector 350, an object detection integration unit 370, and a controller 390. The multi-scale object detection device 130 according to an embodiment of the present disclosure may not necessarily include all of the above-mentioned components. That is, some of the components may be excluded according to each embodiment, or some or all of the components may be selectively included. Hereinafter, the operation of each of the components will be described in detail.

The image frame acquisition unit 310 may acquire a plurality of consecutive image frames. Here, the plurality of consecutive image frames may be basically extracted from a single video, but the present disclosure, needless to say, is not limited thereto. The image frame acquisition unit 310 may extract the plurality of consecutive image frames from a video captured by the unmanned aerial vehicle 110 when interworking with the unmanned aerial vehicle 110. In addition, the image frame acquisition unit 310 may acquire the plurality of consecutive image frames based on image frames provided by a user's terminal. The image frames acquired by the image frame acquisition unit 310 may be stored and managed in the database 150.

In an embodiment, the image frame acquisition unit 310 may obtain a plurality of consecutive image frames by analyzing sequential video frames and extracting image frames that are continuous in time series and have a similar background. The image frame acquisition unit 310 may extract consecutive frames from a single video, and may selectively extract image frames from video frames of which the video consists as needed.

For example, the image frame acquisition unit 310 may extract consecutive image frames at the same time interval from sequential video frames, and may also obtain consecutive image frames by selecting image frames having a similar background in a time series order based on the similarity among images from sequential video frames.

The critical region extractor 330 may extract at least one second critical region from a current image frame based on at least one first critical region extracted from a previous image frame among consecutive image frames. Here, the critical region may correspond to a region in which an object appears to exist in the image frame, and the first and second critical regions may correspond to regions in which objects appear to exist in the previous and current image frames, respectively. The previous and current image frames may have a plurality of the first and second critical regions, respectively.

In addition, the first and second critical regions may be referred to as a set of regions in which objects appear to exist in their image frame. That is, a plurality of objects may be detected within one critical region, and a critical region may be determined based on the density, the number, etc. of objects. The critical region extractor 330 may determine a critical region in a current image frame based on information about a critical region extracted from a previous image frame based on an object whose position does not change significantly in consecutive image frames. In particular, in the case of a video taken by the unmanned aerial vehicle 110 such as a drone, information on a critical region extracted from a previous image frame may be very useful in that the values of coordinates of objects change relatively slightly compared to a video taken on the ground.

In an embodiment, the critical region extractor 330 may determine the position of at least one first critical region in a current image frame to determine at least one second critical region. Since the first critical region may be an image region on a previous image frame, the critical region extractor 330 may determine a position corresponding to the first critical region on the current image frame.

For example, when an object existing in the first critical region is detected in a current image frame, the critical region extractor 330 may determine the position of the first critical region based on the position of the object. The critical region extractor 330 may newly define a region having a size corresponding to the size of the first critical region based on the position of the detected object and determine the region as the second critical region. In this case, the size of the first critical region may be presented as a relative distance from the position of the object in the first critical region to the boundary of the region, and the critical region extractor 330 may determine the second critical region by determining the boundary of the new region according to the relative distance based on the position of the determined object in the current image frame.

In an embodiment, the critical region extractor 330 may sort out at least one second critical region by extracting a reference object from each of at least one first critical region and matching the reference object to a current image frame. When a plurality of objects exist in the first critical region, the critical region extractor 330 may select any one of the plurality of objects and determine it as a reference object. In this case, the reference object may be selected from the plurality of objects based on the size of the object, the difference between its color and the color of its surroundings, etc.

For example, the reference object may correspond to an object having the largest size or an object whose color is most distinct from its surroundings among the plurality of objects. That is, the critical region extractor 330 may determine an object that is best identified in the first critical region as the reference object so that a matching position on a current image frame may be more accurately determined. In addition, when a plurality of the first critical regions exist on one image frame, the critical region extractor 330 may determine the second critical region for each of the first critical regions, and may sort out the second critical regions on the current image frame based on a reference object for each critical region.

In an embodiment, at least one first critical region may be fed back to the critical region extractor 330 by the multi-scale object detector 350. The multi-scale object detector 350 may generate information on the first critical region in which a plurality of objects exist in the process of detecting objects in a previous image frame, and the critical region extractor 330 may receive, as feedback information, information generated by the multi-scale object detector 350 with respect to the previous image frame in the process of determining the second critical region on the current image frame. That is, in the case of a plurality of successive image frames, on the assumption that there is a similarity in the position of objects on the successive frames, the critical region extractor 330 may use the information generated by the multi-scale object detector 350 with respect to the previous image frame to perform an operation on the current image frame.

The multi-scale object detector 350 may undergo a first object detection process for a current image frame and a second object detection process for at least one second critical region. The multi-scale object detector 350 may perform an operation of detecting objects at various scales in order to increase the accuracy in detecting objects. Here, the first object detection process may correspond to an operation of detecting objects performed on the entire current image frame. The second object detection process may correspond to an operation of detecting objects performed on at least one second critical region defined in a current image frame. Accordingly, the result of object detection for the entire current image frame may be generated by processing the first object detection process, and the result of object detection for the second critical region may be generated by processing the second object detection process.

In an embodiment, the multi-scale object detector 350 may down-sample a current image frame in the first object detection process and then detect a first object. Since the first object detection process may be processed for the entire current image frame, the multi-scale object detector 350 may perform the operation of down-sampling on the image frame in order to reduce the time required for object detection. That is, it may possible to reduce the absolute size of the region for the object detection by performing the operation of down-sampling. The multi-scale object detector 350 may swiftly generate a detection result for the first object by reducing the resolution of the image by performing the operation of down-sampling.

In an embodiment, the multi-scale object detector 350 may determine the position and the class of the first object by detecting the first object. In other words, the multi-scale object detector 350 may generate information about the position and the class of the first object as a result of object detection. In this case, the information about the position and the class of the first object may vary depending on a model or algorithm for the object detection.

In an embodiment, the multi-scale object detector 350 may extract the location and the class of a second object with relatively high precision from at least one second critical region during the second object detection process. Going through the second object detection process may correspond to an operation of detecting the second object in the second critical region defined in a current image frame. Since the size of the second critical region may be smaller than the size of the current image frame, the multi-scale object detector 350 may perform object detection based on the current resolution of the second critical region. As a result, it may possible to produce a result of object detection with relatively high precision by undergoing the second object detection process. In addition, information about the location and the class of the second object may also be generated as a result of object detection by going through the second object detection process.

In an embodiment, the multi-scale object detector 350 may undergo the second object detection process only for some of the second critical regions when the number of the second critical regions exceeds a preset first threshold value. For example, when there are a number of the second critical regions and the second object detection process is expected to take longer than the first object detection process, the multi-scale object detector 350 may go through the second object detection process only for the top "n" ("n" is a natural number) second critical regions after arranging the second critical regions in order of size.

In an embodiment, when the size of the second critical region exceeds a preset second threshold value, the multi-scale object detector 350 may skip the second object detection process for the corresponding second critical region. For example, when the area of the second critical region occupies two thirds or more of the area of a current image frame, the multi-scale object detector 350 may undergo the second object detection process only for the rest of the second critical regions except for the corresponding second critical region.

In an embodiment, the multi-scale object detector 350 may assign the first object detection process to a first processor and the second object detection process to a second processor to process the first and second object detection processes in parallel. The first object detection process may require excellent computational power since it may proceed for the entire current image frame, and the second object detection process may require less excellent computational power since it may proceed for a portion of the current image frame. For example, the first processor processing the first object detection process may correspond to the graphics processing unit (GPU), and the second processor processing the second object detection process may correspond to the central processing unit (CPU). In particular, the multi-scale object detector 350 may process the first and second object detection processes in parallel by using the GPU and the CPU.

The object detection integration unit 370 may integrate results of the first and second object detection processes. The object detection integration unit 370 may generate a detection result with a higher accuracy than when going through a single process by integrating the detection results of the first and second object detection processes. There may be various methods of integrating the detection results of the first and second object detection processes.

In an embodiment, the object detection integration unit 370 may integrate the second objects extracted during the second object detection process with the first objects extracted during the first object detection process to determine objects in the entire current image frame. That is, the first objects may include some of the second objects, and the object detection integration unit 370 may perform the integration operation by replacing the first objects overlapping with the second objects by their corresponding second objects.

In an embodiment, when some of the first objects extracted during the first object detection process overlap with the second objects extracted during the second object detection process, the object detection integration unit 370 may replace location information on those overlapping first objects with location information on their corresponding second objects, and may determine class information based on the proportion of the first and second objects having the same class. For example, the object detection integration unit 370 may apply class information on the first objects when the proportion of the objects having the same class to the overlapping objects exceeds 0.5, and may replace the class information on the first objects with class information of the second objects otherwise.

The controller 390 may control the overall operation of the multi-scale object detection device 130, and may manage a control flow or data flow among the image frame acquisition unit 310, the critical region extractor 330, the multi-scale object detector 350, and the object detection integration unit 370.

Figure 4:
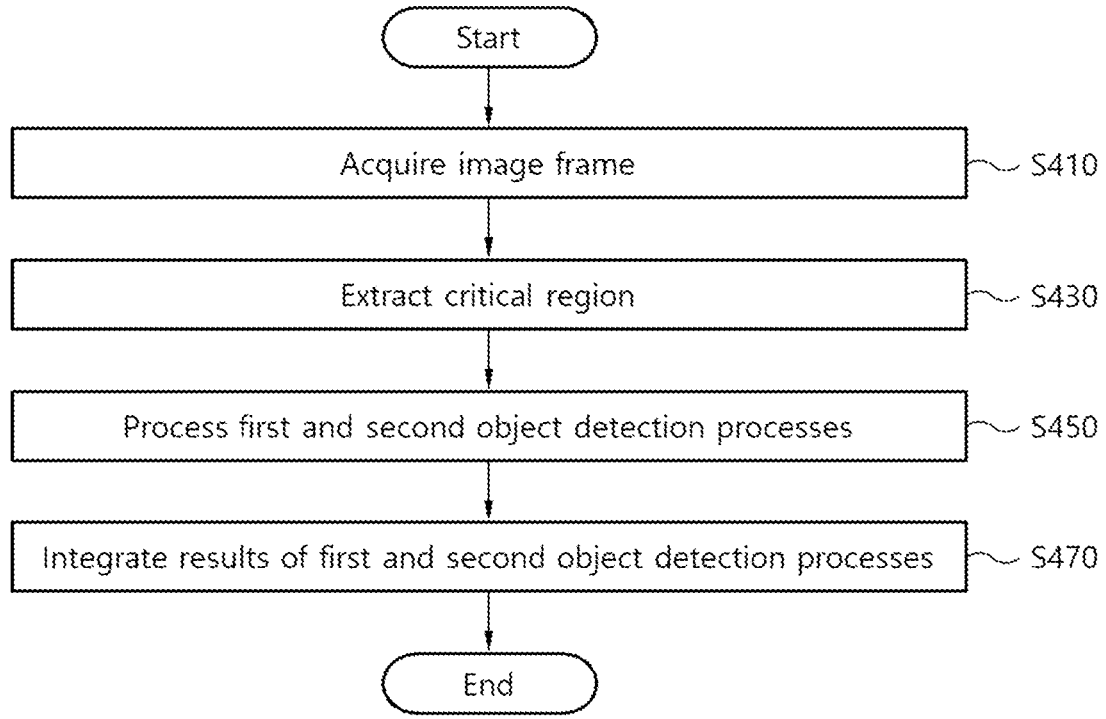
FIG. 4 is a flowchart illustrating a multi-scale object detection method according to the present disclosure.

FIG. 4 is a flowchart illustrating a multi-scale object detection method according to the present disclosure.

Referring to FIG. 4, the multi-scale object detection device 130 may acquire a plurality of consecutive image frames based on the image frame acquisition unit 310 at S410. The multi-scale object detection device 130 may extract at least one second critical region from a current image frame based on at least one first critical region extracted from a previous image frame among the consecutive image frames based on the critical region extractor 330 at S430.

In addition, the multi-scale object detection device 130 may undergo the first object detection process for a current image frame and the second object detection process for at least one second critical region based on the multi-scale object detector 350 at S450. The multi-scale object detection device 130 may integrate the results of the first and second object detection processes based on the object detection integration unit 370 at S470. That is, the multi-scale object detection device 130 may generate a result of object detection for the current image frame by integrating the results of the first and second object detection processes.

Figure 5:
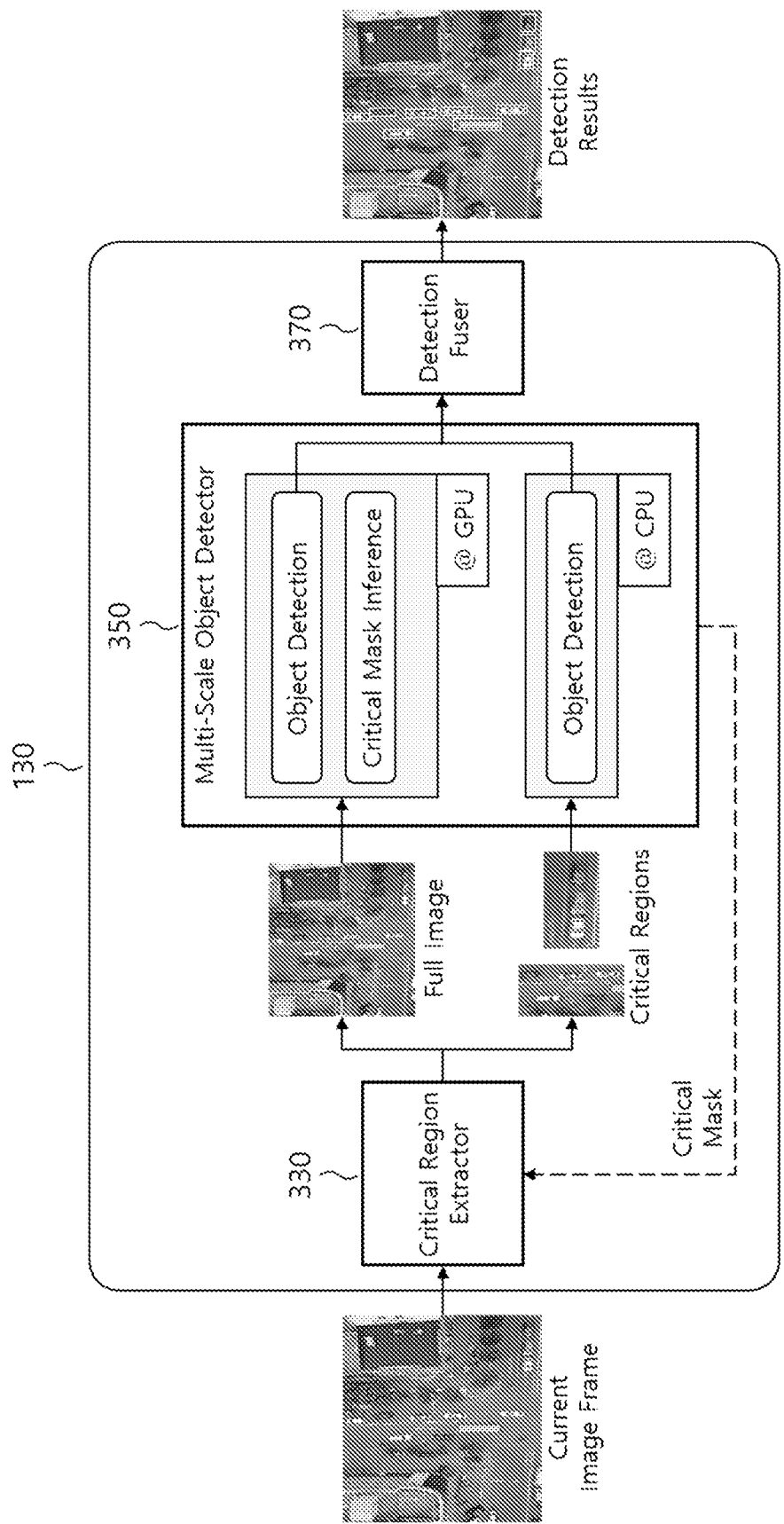
FIG. 5 is a view illustrating the process of the operation of the multi-scale object detection device according to the present disclosure.

FIG. 5 is a view illustrating the process of the operation of the multi-scale object detection device according to the present disclosure.

Referring to FIG. 5, the multi-scale object detection device 130 may receive a current image frame as an input value and output the positions and classes of detected objects as detection results. In this case, the positions of the objects may be visualized and marked with a bounding box on the image frame, and the classes of the objects may also be output around the bounding box. Meanwhile, the multi-scale object detection device 130 may acquire a plurality of consecutive image frames based on the image frame acquisition unit 310.

Furthermore, the multi-scale object detection device 130 may extract a critical region, which is a region in which objects are likely to exist on a current image frame. The multi-scale object detection device 130 may extract at least one second critical region from the current image frame based on the critical region extractor 330. In one embodiment, at least one first critical region (Critical Mask) may be fed back to the critical region extractor 330 by the multi-scale object detector 350 so that the critical region extractor 330 may use it in the process of extracting the second critical region.

In addition, the multi-scale object detection device 130 may perform object detection individually for each of a current image frame (Full Image) and at least one second critical region (Critical Regions). In this case, the first object detection process for the current image frame may be processed by the GPU, and the second object detection process for the at least one second critical region may be processed by the CPU. That is, since the first and second object detection processes may be processed by different operation units, the processes may be processed in parallel.

In addition, the first critical region may be determined based on the detection result of the first object detection process, and then may be used in the process of detecting objects in the next image frame. In other words, the first object detection process may involve an object detection process and a first critical mask inference process. In this case, the object detection process may be processed by SSD-MobileNet V2, but is not necessarily limited thereto. Accordingly, the region where an object exists in an image frame and the class of the object may be generated as a result of object detection.

In addition, the multi-scale object detection device 130 may finally generate a result of object detection for a current image frame by integrating the detection results generated in the first and second object detection processes. In particular, the multi-scale object detection device 130 may perform object detection with relatively high accuracy for some regions of an image frame in parallel in an environment that requires a real-time object detection, such as a drone, in order to compensate for the loss of accuracy due to the real-time object detection.

Figure 6:
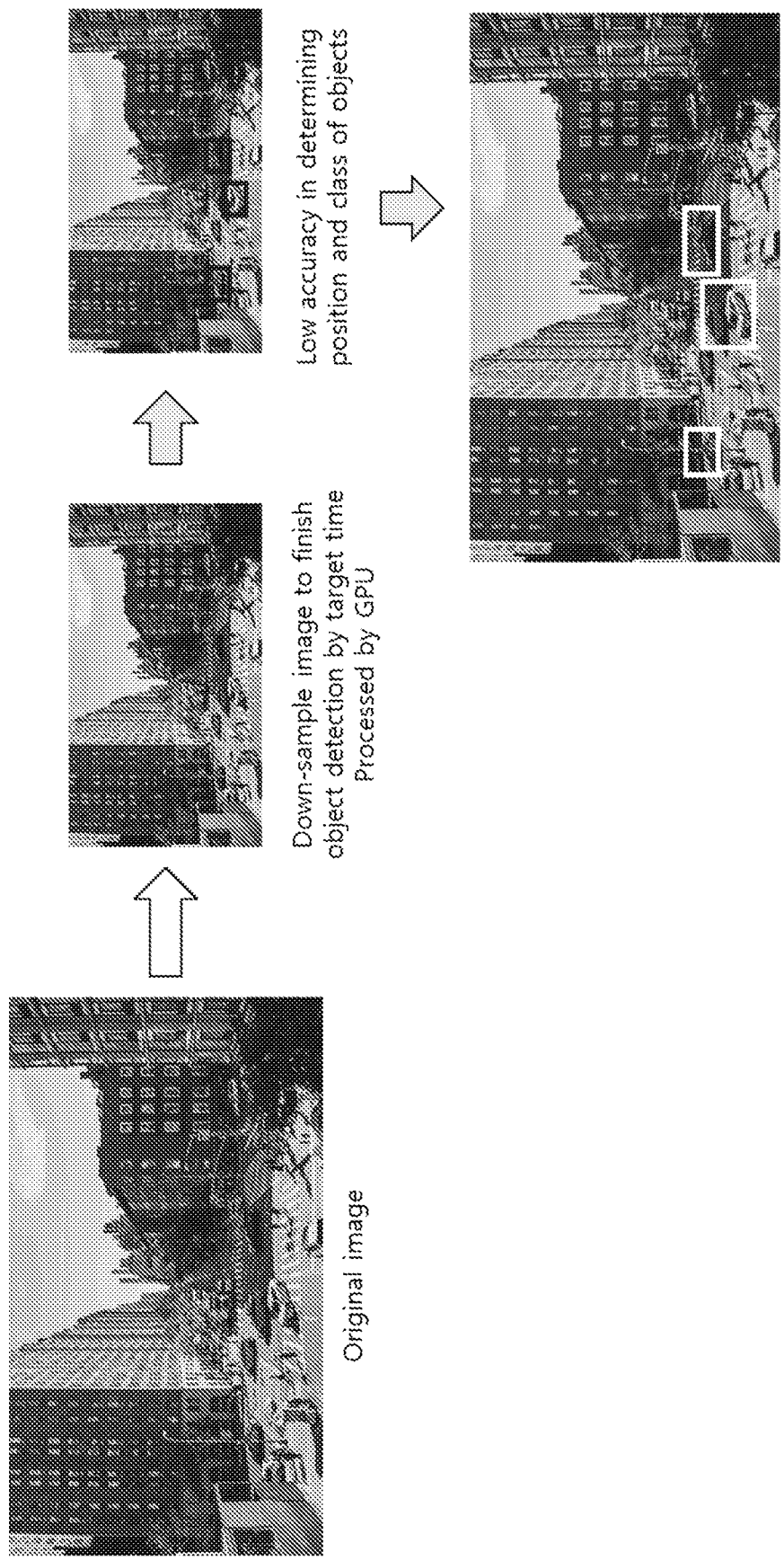
FIGS. 6 to 8 are views illustrating an embodiment of the multi-scale object detection method according to the present disclosure.
Figure 7:
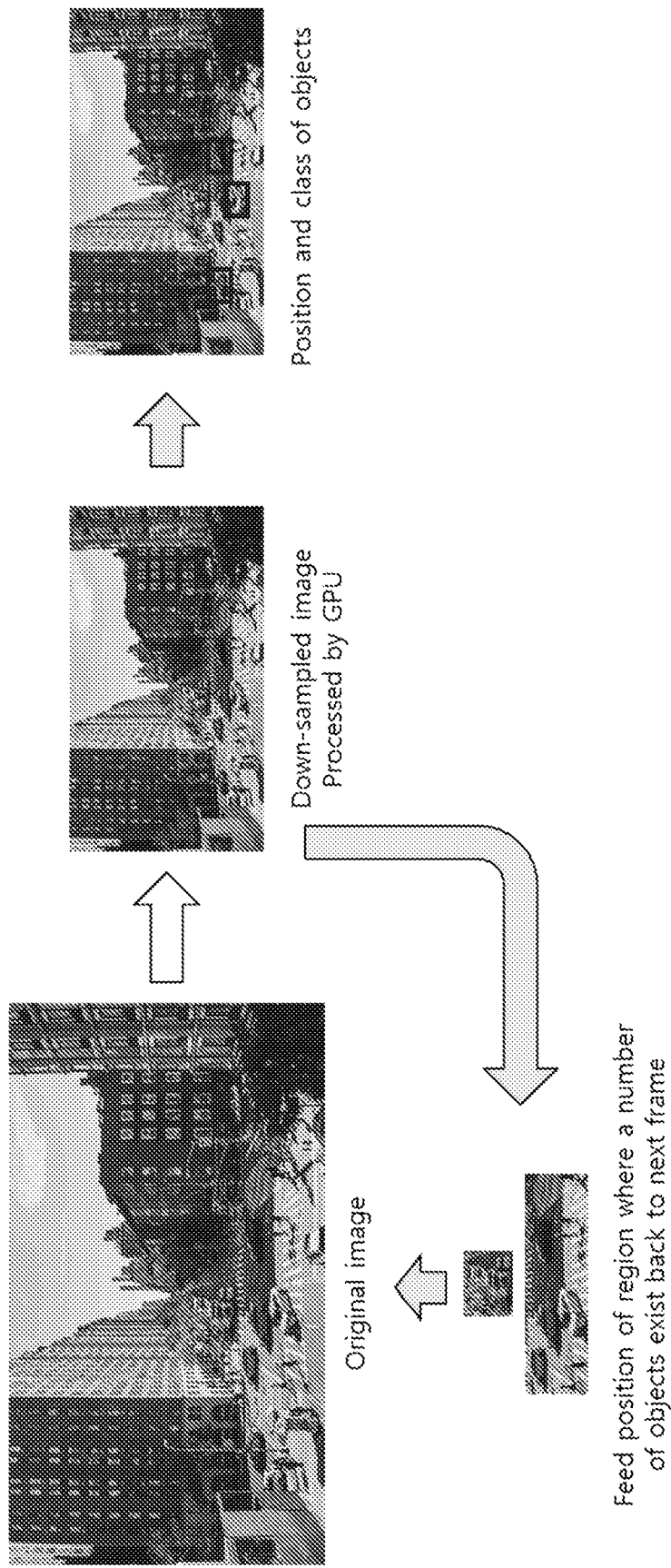
Figure 8:
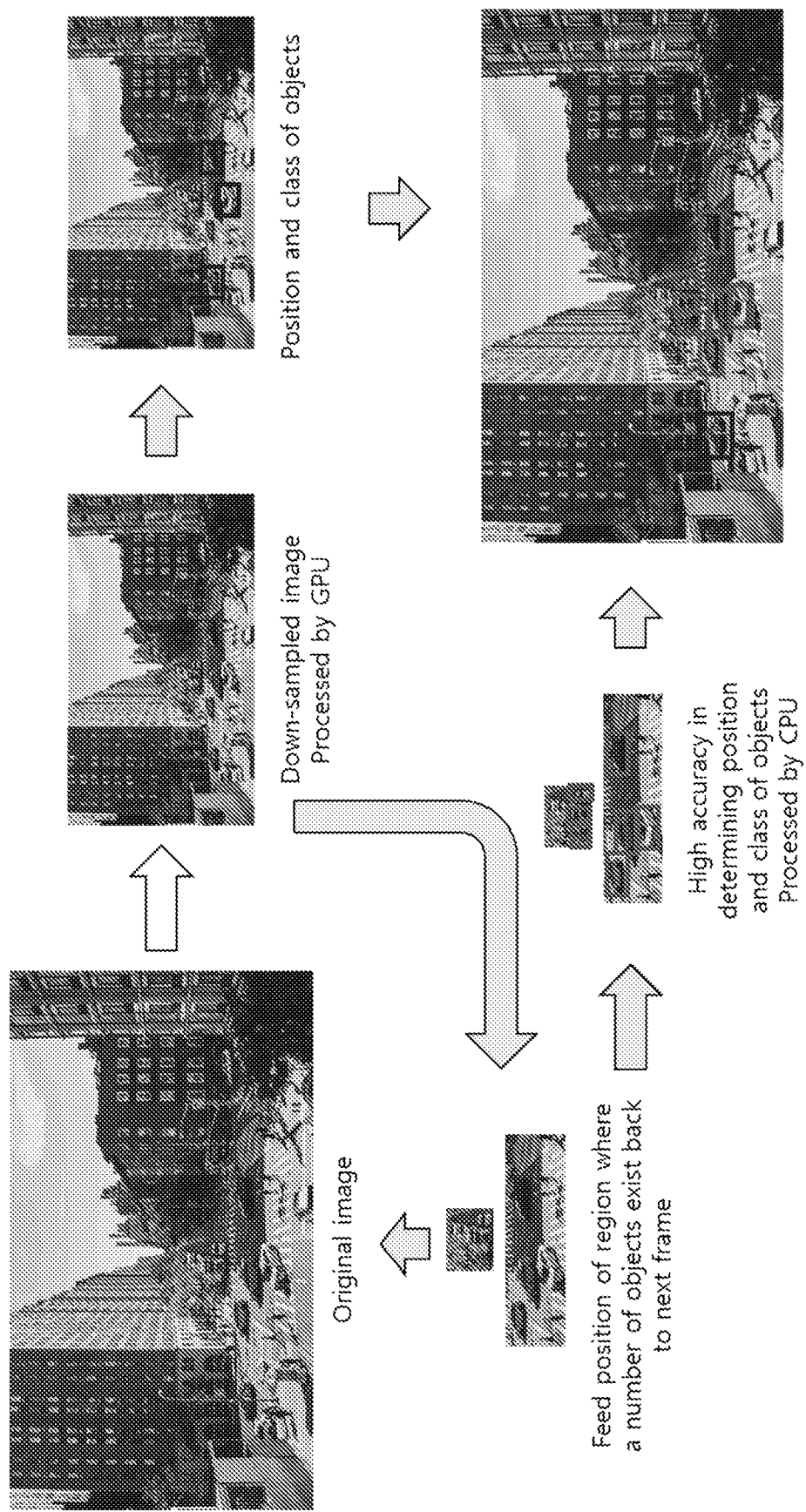

FIGS. 6 to 8 are views illustrating an embodiment of the multi-scale object detection method according to the present disclosure.

Referring to FIG. 6, in the case of a conventional object detection method, an operation of reducing the size of an image may be necessarily performed in order to perform object detection on an original image within a limited time. In other words, in the method, the object detection may be mainly performed by the GPU, which has improved computational power over the CPU, and the time required for the object detection may be reduced by reducing the absolute size of the image by performing the down-sampling operation. However, in this case, there may be a problem in that the accuracy of the object detection is lowered since information about the image is lost in the down-sampling process.

Referring to FIGS. 7 and 8, a region in which a plurality of objects exist may be derived while the GPU carries out object detection, and the region may be used for the object detection in the multi-scale object detection method, so that the problem of reduced accuracy may be solved. That is, as shown in FIG. 8, region information derived from a previous image frame may be applied to a current image frame, and object detection on image frames of different scales may be performed in parallel by using the CPU and GPU simultaneously. In the multi-scale object detection method, the object detection may be additionally performed only for the region where the plurality of objects appear to exist so that the accuracy of the object detection may be supplemented.

In the detailed description of the present disclosure above, descriptions have been made with reference to the desirable embodiments of the present disclosure, but it should be understood by a person skilled in the technical field that various modifications and variations of the present disclosure are possible within the scope of the technology of the present disclosure as set forth in the following claims.

What is claimed is:

1. A multi-scale object detection device comprising:
   an image frame acquisition unit for acquiring a plurality of consecutive image frames;
   a critical region extractor for extracting at least one second critical region from a current image frame based on at least one first critical region extracted from a previous image frame among the consecutive image frames;
   a multi-scale object detector whose operation involves a first object detection process for the current image frame and a second object detection process for the at least one second critical region; and
   an object detection integration unit for integrating results of the first and second object detection processes,
   wherein the critical region extractor
     determines a position of a reference object of the at least one first critical region on the previous image frame, matches the reference object to an object of the current image frame, and determines a position of the at least one second critical region as a position of the object of the current image frame, and
     defines the second critical region as a region at the position of the object of the current image frame and having a boundary set at a distance from the position of the object of the current image frame that corresponds to a distance from the reference object of the at least one first critical region to a boundary of the at least one first critical region, and
   wherein the image frame acquisition unit, the critical region extractor, the multi-scale object detector, and the object detection integration unit are each implemented via at least one processor.

2. The multi-scale object detection device of claim 1, wherein the image frame acquisition unit analyzes sequential video frames and extracts image frames that are successive in time series and have a similar background to determine the plurality of consecutive image frames.

3. The multi-scale object detection device of claim 1, wherein the at least one first critical region is fed back to the critical region extractor by the multi-scale object detector.

4. The multi-scale object detection device of claim 1, wherein the multi-scale object detector detects a first object after down-sampling the current image frame in the first object detection process.

5. The multi-scale object detection device of claim 4, wherein the multi-scale object detector determines a position and a class of the first object by detecting the first object.

6. The multi-scale object detection device of claim 4, wherein the multi-scale object detector extracts a position and a class of a second object with a relatively high accuracy from the at least one second critical region in the second object detection process.

7. The multi-scale object detection device of claim 1, wherein the multi-scale object detector assigns the first object detection process to a first processor and assigns the second object detection process to a second processor to process the first and second object detection processes in parallel.

8. The multi-scale object detection device of claim 1, wherein the object detection integration unit detects objects on the entire current image frame by integrating a second object extracted in the second object detection process with a first object extracted in the first object detection process.

9. A multi-scale object detection method comprising:
an image frame acquisition step of acquiring a plurality of successive image frames;
a critical region extraction step of extracting at least one second critical region from a current image frame based on at least one first critical region extracted from a previous image frame among the successive image frames;
a multi-scale object detection step involving a first object detection process for the current image frame and a second object detection process for the at least one second critical region; and
an object detection integration step of integrating results of the first and second object detection processes,
wherein the critical region extraction step involves a step in which
a position of a reference object of the at least one first critical region on the previous image frame is determined, the reference object is matched to an object of the current image frame, and a position of the at least one second critical region is determined as a position of the object of the current image frame, and
the second critical region is defined as a region at the position of the object of the current image frame and having a boundary set at a distance from the position of the object of the current image frame that corresponds to a distance from the reference object of the at least one first critical region to a boundary of the at least one first critical region.

10. The multi-scale object detection method of claim 9, wherein the critical region extraction step involves a step in which the at least one first critical region determined in the multi-scale object detection step is fed back.

11. The multi-scale object detection method of claim 9, wherein the multi-scale object detection step involves a step in which a first object is detected after down-sampling the current image frame in the first object detection process.

12. The multi-scale object detection method of claim 11, wherein the multi-scale object detection step involves a step in which a position and a class of a second object are extracted with a relatively high accuracy from the at least one second critical region in the second object detection process.

13. The multi-scale object detection method of claim 9, wherein the multi-scale object detection step involves a step in which the first object detection process is assigned to a first processor and the second object detection process is assigned to a second processor so that the first and second object detection processes are processed in parallel.

* * * * *